United States Patent [19]

Freeman et al.

[11] 4,051,569
[45] Oct. 4, 1977

[54] FOLDING AND SEALING APPARATUS AND METHOD

[75] Inventors: David Bruce Freeman, Cincinnati; Michael C. Patton, Fairfield; Carl F. Dragan, Harrison, all of Ohio

[73] Assignee: Louis G. Freeman Company, Cincinnati, Ohio

[21] Appl. No.: 735,009

[22] Filed: Oct. 22, 1976

[51] Int. Cl.² .................. A43D 11/00; C14B 00/00; B65H 45/22
[52] U.S. Cl. .................. 12/146 CK; 12/55; 69/1; 270/93
[58] Field of Search ............. 12/55, 22, 30, 52, 55.1, 12/146 CK; 69/1; 270/93, 61 R, 66, 83

[56] References Cited

U.S. PATENT DOCUMENTS

| 2,198,140 | 4/1940 | Vachon et al. | 12/146 CK |
| 3,073,141 | 1/1963 | Freeman | 12/55 |
| 3,443,269 | 5/1969 | Heiseler | 12/55 |

Primary Examiner—Patrick D. Lawson
Attorney, Agent, or Firm—Melville, Strasser, Foster & Hoffman

[57] ABSTRACT

An apparatus for folding and sealing the edges of a non-rigid work piece and a method of performing folding and sealing operations therewith. The apparatus comprises a press with a main cylinder, at least one auxiliary cylinder and upper and lower die assemblies for the press. The upper die assembly comprises a folding cavity plate operatively connected to the main cylinder and having a folding cavity with an electrode surrounding a part at least of the cavity. A stripper in association with the upper die assembly is independently shiftable by the at least one auxiliary cylinder between a retracted position above the folding cavity and an extended position therebelow. The bottom die assembly comprises a plate having a female cavity therein of a size and shape equivalent to that of the folded work piece and a male plug receivable within the female cavity with close tolerance. The female cavity plate and the male plug are shiftable relative to each other by the folding cavity plate and the stripper, respectively, of the upper die assembly. Means are provided to connect the electrode and the stripper to a source of high frequency electricity.

In performing the folding and sealing steps, the work piece is first forced into the female cavity by the stripper to initiate the bending of the work piece edges. The work piece is thereafter forced into the folding cavity by the male plug to complete the folding step. The electrode and the stripper are thereafter connected to the source of high frequency electricity to seal the folded edges of the work piece with the stripper in one of three positions: (a) against the work piece under pressure, (b) against the work piece without pressure, and (c) retracted and out of contact with the work piece. The apparatus may also be used to seal at least a second layer to the work piece.

30 Claims, 19 Drawing Figures

FOLDING AND SEALING APPARATUS AND METHOD

BACKGROUND OF THE INVENTION

1. Field of the Invention

The invention relates to an apparatus and a method for folding and sealing a work piece, and more particularly to such an apparatus and method utilizing electrical high frequency sealing means.

2. Background of the Invention

The folding and sealing apparatus and method of the present invention have many applications. While not intended to be so limited, for purposes of an exemplary showing the present invention will be described in its application to the manufacture of parts for the shoe industry, and in a particular example to the folding and sealing of the edges of a shoe vamp and to the attachment of a reinforcing layer or a liner to the vamp.

Heretofore, prior art workers have provided apparatus for folding the edges of parts such as a shoe vamp. An exemplary apparatus is taught, for example, in United States Letters Patent 3,073,141. In the usual use of such apparatus, the edges of the work piece to be folded are generally precoated with a rubberbase adhesive or the like so that they become temporarily bonded after the folding step. Thereafter, the folded edges are additionally stitched together.

Prior art workers have also heretofore used high frequency electricity to bond folded parts together permanently. Under these circumstances, the parts are folded in one operation and subsequently heat sealed together in a separate operation.

Where a part such as a vamp is to be provided with a liner, the liner is cut oversize, stitched to the vamp and thereafter trimmed. If reinforcement is to be applied to the part that is generally accomplished as a separate step prior to the folding step.

The present invention provides a folding and sealing apparatus and method by which the edges of a vamp may be folded and sealed by high frequency electricity during a single cycle of the apparatus. Where reinforcement is to be associated with the work piece, this can be accomplished during the same cycle. A liner, precut to final size, can be heat sealed to the vamp in a second cycle.

Through the use of the apparatus of the present invention and the practice of the methods taught herein, the above mentioned operations are generally simplified. The parts may be heat sealed by an electrode incorporated within the apparatus and connected to a source of high frequency current. The sealing step may be accomplished in a variety of modes with the same apparatus. Finally, the invention lends itself well to the use of unsupported, man-made material compatable with high frequency sealing techniques or materials precoated with an adhesive compatable with such techniques.

SUMMARY OF THE INVENTION

This invention is concerned with an apparatus for folding and sealing the edges of a non-rigid work piece and a method of performing folding and sealing operations therewith. The apparatus comprises a press with a main cylinder, at least one auxiliary cylinder and upper and lower die assemblies.

The upper die assembly comprises a top plate operatively connected to the main cylinder and a sub-plate supported by the top plate in parallel spaced relationship therebelow. A folding cavity plate, provided with an electrode surrounding a portion at least of the folding cavity therein, is mounted on the underside of the sub-plate. A stripper is supported by a stripper plate located between the top plate and the sub-plate. The stripper plate is operatively connected to the at least one auxiliary cylinder and is movable thereby independently of the main cylinder to shift the stripper between a retracted position above the folding cavity and an extended position below the folding cavity.

The bottom die comprises a base plate surmounted by a cavity plate in parallel spaced relationship thereto. The cavity plate has a female cavity of a size and shape equivalent to the size and shape of the folded work piece. The cavity plate is shiftable between an upper position in parallel spaced relationship with the base plate and a lower position in parallel spaced relationship with the base plate and means are provided to urge the cavity plate to its upper position. A male plug, adapted to be received within the female cavity with close tolerence, is mounted on a male plug support plate located between the cavity plate and the base plate of the lower die assembly. The male plug and its support plate are shiftable between an upper position wherein the plug is located within the female cavity and a lower position wherein the plug support plate lies in abutment with the base plate. Means are provided to urge the plug and the plug support plate to their upper position. The female cavity plate and the plug and its support plate are independently shiftable between their respective positions.

In accordance with the present invention, a work piece is located on the female cavity plate of the bottom die assembly. The work piece is thereafter forced into the female cavity by the stripper of the upper die assembly shifting the male plug of the lower die assembly to its lower position. This initiates the bending of the work piece edges. The further downward movement of the upper die assembly causes the female cavity plate of the bottom die assembly to shift downwardly so that the male plug forces the work piece into the folding die cavity of the upper die assembly, completing the folding of the work piece edges. The folded edges of the work piece are contacted by the folding cavity plate electrode and may be sealed thereby when the electrode is connected to a source of high frequency electricity.

Since the stripper of the upper die assembly is independently controlled by the at least one auxiliary cylinder, the sealing step may be accomplished in one of three modes. During the sealing step, the stripper may be caused to bear against the work piece under pressure exerted by the at least one auxiliary cylinder. The auxiliary cylinder may be vented so that the stripper simply rests upon the work piece without pressure. Finally, the auxiliary cylinder may be so energized as to retract the stripper so that the stripper does not contact the work piece during the sealing step.

A work piece and a reinforcing layer may be simultaneously fed into the apparatus and the work piece will have its edges folded about and bonded to the edges of the reinforcing layer. The nature of this bond will depend upon the mode of operation selected by the operator. Finally, an additional layer such as a liner may be bonded to a folded and sealed work piece through the same series of steps. Again, the nature of the bond between the liner and the work piece will depend upon the mode of operation used.

BRIEF DESCRIPTION OF THE DRAWINGS

FIG. 6 is a plan view of the stripper plate support frame of the press of FIG. 1.

FIG. 15 is a fragmentary, semi-diagramatic, side elevational view (partly in cross section) similar to FIG. 14 and illustrating the relative positions of the press and die assemblies at the time the final 180° fold is made in the work piece.

FIG. 16 is a fragmentary, semi-diagramatic, elevational view (partly in cross section) similar to FIGS. 14 and 15 and illustrating the press and die assemblies in their relative positions in accordance with one mode of operation of the present invention.

DESCRIPTION OF THE PREFERRED EMBODIMENTS

Figures 1, 2:
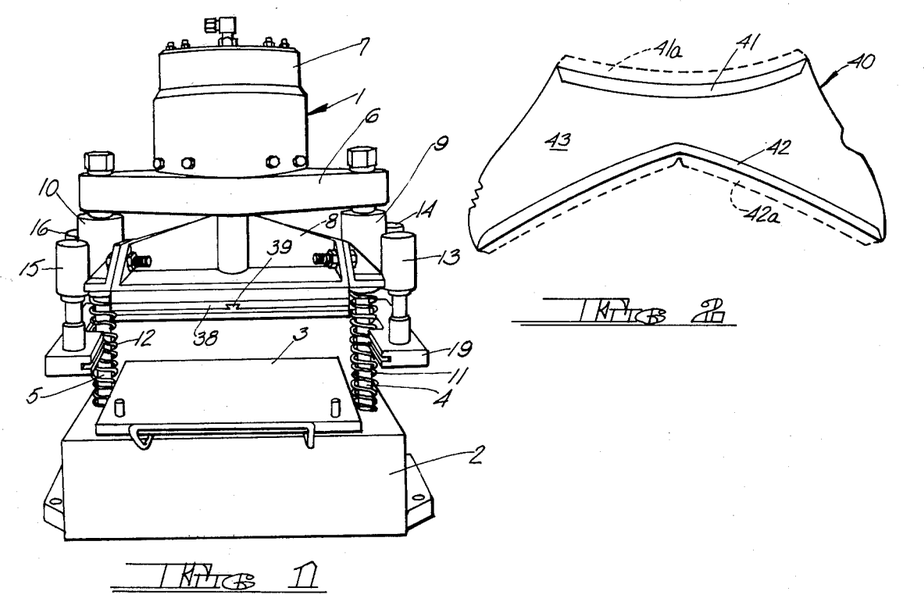
FIG. 1 is a perspective view of a folding and sealing press of the present invention with the dies removed.
FIG. 2 is a bottom view of an exemplary work piece in the form of a shoe vamp in folded condition, the unfolded configuration of the vamp being indicated in broken lines.

For a better understanding of the present invention reference is first made to FIG. 1 wherein the folding and sealing press is shown with the upper and lower die assemblies removed. The press is generally indicated at 1 and comprises a base 2 which supports a carrier 3 for the bottom die assembly. The carrier 3 is mounted on the base by any appropriate means enabling it to be shifted horizontally between a working position within the press and a bottom die assembly loading and unloading position wherein it extends forwardly and partially out of the press. Thus, as will be evident hereinafter, when the bottom die assembly is mounted on the carrier 3 it may be readily shifted by the carrier between a position wherein a work piece may be easily inserted in or removed from the bottom die assembly and a working position wherein the work piece is subjected to the folding and sealing operations of the present invention.

A pair of posts 4 and 5 extend upwardly from press base 2 in parallel spaced relationship. These posts support a cylinder mounting plate 6 to which the pneumatic main cylinder 7 is affixed. The piston rod 7a (see FIG. 5) of main cylinder 7 is connected to a casting 8 located beneath cylinder mounting plate 6. The casting 8 includes a pair of substantially cylindrical guides 9 and 10 having perforations through which the posts 4 and 5 extend with a sliding fit. The guides 9 and 10, in cooperation with the posts 4 and 5 maintain proper alignment of the casting 8.

The post 4 has a spring 11 mounted thereon. The bottom end of the spring abuts the base 2, while the top end of the spring abuts guide 9. In similar fashion, post 5 mounts a spring 12 the bottom end of which abuts the base 2 and the top end of which abuts guide 10. The springs 11 and 12 serve (in addition to a spring within cylinder 7, not shown) as return means for the main cylinder which is of the single-acting type.

Figure 5:
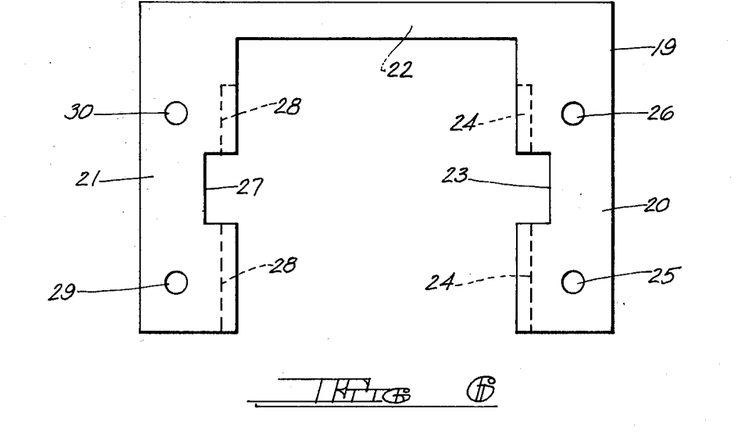
FIG. 5 is a fragmentary, semi-diagramatic, elevational view (partly in cross section) of the press and die assemblies of the present invention in their normal, at-rest positions.

Reference is now made to FIG. 5 as well as FIG. 1, and again like parts have been given like index numerals. For purposes of clarity, the base 2, side posts 4 and 5, springs 11 and 12, guides 9 and 10 and the cylinder mounting plate 6 have been eliminated from FIG. 5. The main cylinder 7 is represented by its piston rod 7a.

As will be evident from FIGS. 1 and 5, the casting 8 carries four stripper plate cylinders 13, 14, 15 and 16. As shown in FIG. 1, cylinders 13 and 14 are located to either side of the post 4 while cylinders 15 and 16 are located to either side of post 5.

The cylinder 13 is provided with a bracket 13a by which it is mounted on the casting 8 by bolt means 17 (see FIG. 5). The remaining cylinders 14 through 16 are similarly mounted. To this end, cylinder 15 in FIG. 5 is shown having a bracket 15a mounted to casting 8 by bolt 18.

The four cylinders 13 through 16 support a stripper plate support frame 19, the purpose of which will be described hereinafter. The stripper plate support frame is illustrated in FIG. 6 and comprises a planar frame having side members 20 and 21 connected by a rear member 22. Side member 20 has a relief 23 so that it may clear post 4 and return spring 11 (see FIG. 1). Side member 20 also has a longitudinally extending notch 24 in the inside edge thereof. Finally, a pair of holes 25 and 26 are located in member 20 for connection thereof to stripper plate cylinders 13 and 14. Side member 21 has a clearance notch 27 to accommodate post 5 and return spring 12 (see FIG. 1). Side member 21 also has a longitudinally extending notch 28 on its inside edge and a pair of mounting holes 29 and 30 by which it may be joined to stripper plate cylinders 15 and 16.

Turning to FIG. 5, it will be noted that stripper plate cylinder 13 has a piston rod 31 which is threadedly engaged in the upper end of an insulative spacer 32. A bolt 33 passes through perforation 25 in the stripper plate support frame 19 and is threadedly engaged in the lower end of insulative spacer 32.

The cylinder 15 is similarly connected to the stripper plate support frame 19. Thus, the piston rod 34 of piston 15 is threadedly engaged in the upper end of an insulative spacer 35. A bolt 36 passes through the perforation 29 of the stripper plate support frame 19 and is threadedly engaged in the lower end of the spacer 35. It will be understood by those skilled in the art that the cylinders 14 and 16 are similarly connected to the stripper plate support frame 19 at the perforations 26 and 30 thereof, respectively, by identical insulative spacer and bolt means (not shown).

Unlike the main cylinder 7, the stripper plate cylinders 13 through 16 are double acting for reasons which will be evident hereinafter. While the cylinders 13 through 16 and main cylinder 17 may be hydraulic, they are preferably pneumatic with cylinders 13 through 16 connected to the same source of pressurized air as is the main cylinder 7.

Finally, as is most clearly shown in FIG. 5, the casting 8 carries a block of insulative material 37 which is attached thereto by bolts or other appropriate fastening means (not shown). A planar steel plate 38 is attached to the bottom surface of the insulative block 37, again by bolts or other appropriate fastening means (not shown). The steel plate 38 has a dove tail slot 39 formed in it. The slot 39 extends at least part way across the plate 38 from its forward edge toward its rearward edge.

The press and die assemblies of the present invention may be used to fold and seal many different types of products. As indicated above for purposes of an exemplary showing, they will be described in terms of their application to the folding and sealing of a work piece in the form of a shoe vamp. An exemplary show vamp is generally indicated at 40 in FIGS. 2 through 4. The vamp may be made of leather or non-fusable synthetics, or it may be made of synthetics capable of being fused or heat sealed. In FIG. 2 the forward edge 41 of the vamp is shown in its folded and sealed position. The original, unfolded configuration of the forward edge is indicated by broken lines at 41a. Similarly, the rearward edge 42 of the vamp is shown in its folded and sealed condition, while its original configuration is shown in broken lines at 42a. When folded, the forward edge 41 and rearward edge 42 are sealed to the bottom surface 43 of the vamp either by adhesive means, heat sealing or through the use of heat-activated adhesive means.

Figures 3, 4:
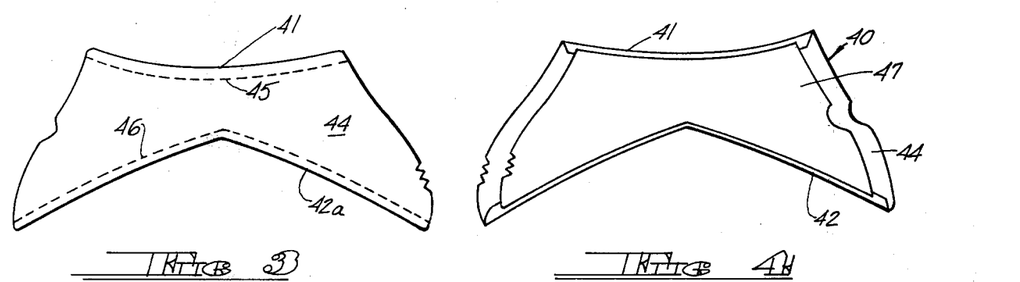
FIG. 3 is a top plan view of the vamp of FIG. 2.
FIG. 4 is a bottom view similar to FIG. 2 and illustrating a liner applied to the vamp.

FIG. 3 is a plan view of the folded and sealed vamp. The top surface 44 of the vamp 40 may be provided with simulated stitching embossed therein during the heat sealing step, as will be described hereinafter. An embossed stitching along the forward portion of the vamp is shown at 45, while a second line of simulated, embossed stitching is illustrated at 46 along the rearward edge of the vamp. The underside or back surface 43 of the vamp may or may not be provided with a cloth backing, depending upon the nature of the shoe being made. Similarly, the vamp may be provided with a liner 47 affixed to its backside, as shown in FIG. 4. The liner 47 may be made of any appropriate material including the same material as the vamp itself and may or may not be cloth backed, as desired. The liner 47 may be sealed to the vamp only along the forward and rearward edges thereof, or it may be sealed overall to the vamp, again as will be described hereinafter.

Figure 7:
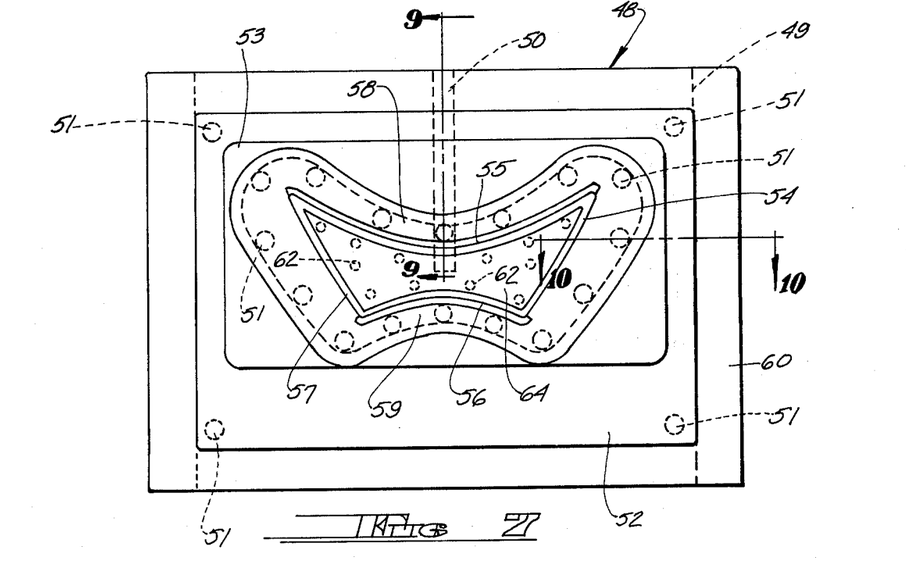
FIG. 7 is a bottom view of the top die assembly.
Figure 8:
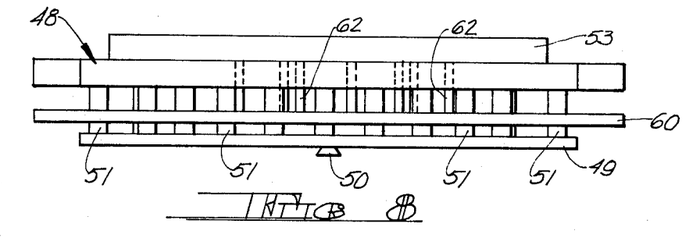
FIG. 8 is an elevational view of the top die assembly as seen from the bottom of FIG. 7.

Reference is now made to FIGS. 5, 7, 8, 9 and 10 wherein the top die assembly is illustrated and wherein like parts have been given like index numerals. In FIG. 5 the top die assembly has been shown in semi-diagramatic, simplified form. In FIGS. 7, 8, 9 and 10 the top die assembly is fully illustrated. It must be remembered that FIG. 7 is a bottom view of the top die and, as a consequence, FIG. 8 illustrates the top die assembly facing upwardly, rather than downwardly as in use and as shown in FIG. 5.

The top die assembly is generally indicated at 48. It comprises a top plate 49 which has a dove tailed gib 50 affixed thereto. The gib 50 is intended to be received in the dove tail slot 39 of steel plate 38 whereby the top die assembly is operatively connected to the casting 8 and main cylinder 7. The die top plate 49 lies in abutment with steel plate 38.

The top plate 49 of the top die assembly has a plurality of support posts 51 mounted thereon and depending downwardly therefrom. For purposes of a simplified showing, only two of support posts 51 are illustrated in FIGS. 5, 14, 15 and 16. The posts 51 support a sub-plate 52. The number and location of the support posts will vary, depending upon the size and shape of the work piece for which the die assemblies are made, to assure adequate and proper support for sub-plate 52. The top die assembly top plate 49, the support posts 51 and the sub-plate 52 are electrically conductive and are preferably made of metal.

A folding cavity plate 53, preferably made of non-conductive material such as hard plastic or the like, is affixed to the underside of sub-plate 52 by screws or the like (not shown). The folding cavity plate has a central opening 54 to accommodate the top die assembly stripper (to be described hereinafter). Those portions of the folding cavity plate which lie adjacent the forward end rearward edges of the vamp work piece which are to be folded, are provided with curved folding cavities 55 and 56. Folding cavity 55 is most clearly shown in FIG. 9. No folding cavity appears at the sides of opening 54 since the side edges of the vamp are not folded. This is illustrated in the cross sectional view of FIG. 10.

Figure 9:
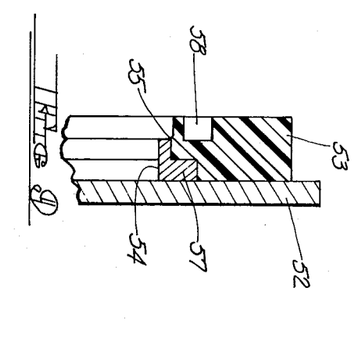
FIG. 9 is a fragmentary cross sectional view taken along section line 9—9 of FIG. 7.
Figure 10:
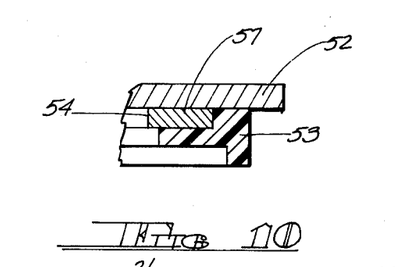
FIG. 10 is a fragmentary cross sectional view taken along section line 10—10 of FIG. 7.
Figure 10D:
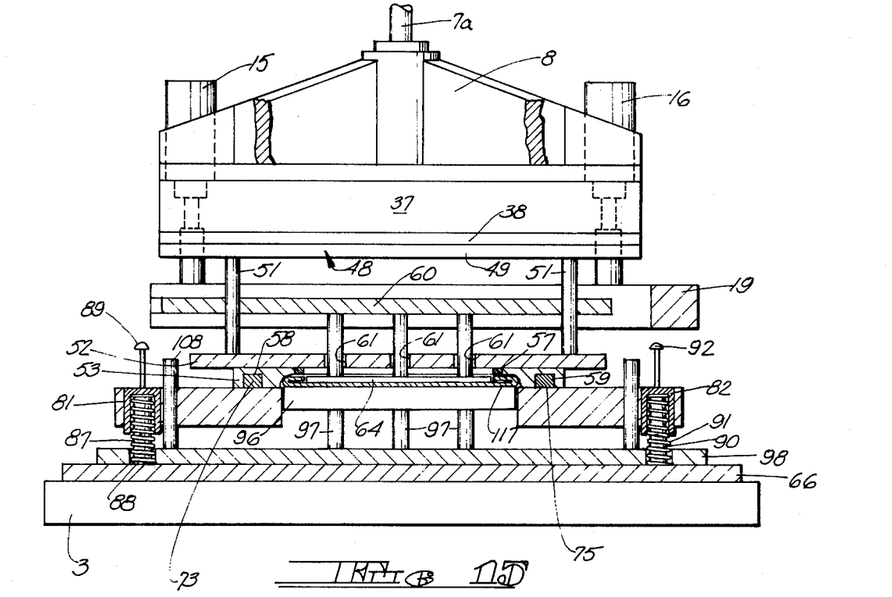
Figure 10E:
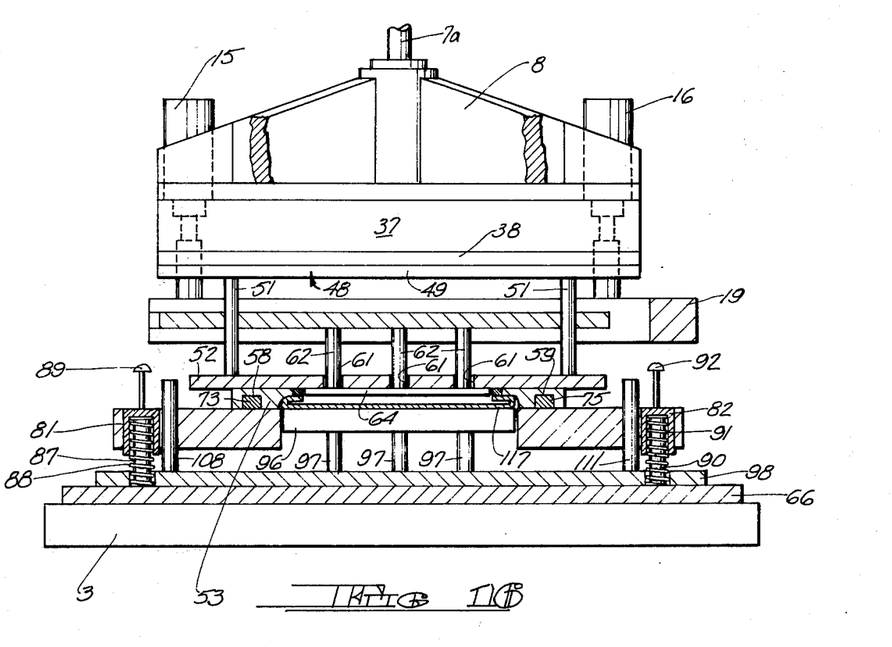

The folding cavity plate 53 is provided with an electrode 57 surrounding and defining central opening 54. Adjacent the folding cavities 55 and 56 and extending therealong, the electrode 57 will be coextensive with the folding cavities so as to seal the work piece folded thereby, as will be described hereinafter. This is shown in FIG. 9. Elsewhere, electrode 57 is recessed as shown in FIG. 10 so as to remain out of contact with the work piece.

Finally, the folding cavity plate will have gauge cavities 58 and 59 formed therein for clearance of the gauges of the bottom die assembly by which the vamp work piece is properly located on the bottom die assembly.

To complete the top die assembly a stripper plate 60 is provided. The stripper plate 60 is located between sub-plate 52 and top plate 49 and is again made of conductive material such as steel or the like. The stripper plate has a plurality of perforations therethrough (two of which are shown at 61 in FIGS. 5 and 14 through 16) permitting support posts 51 to pass therethrough with a sliding fit. Stripper plate 60 has a plurality of supports 62 (only three of which are shown for purposes of clarity in FIGS. 5 and 14 through 16) depending downwardly therefrom. Supports 62 pass through perforations 63 in sub-plate 52 with a sliding fit. The lowermost ends of supports 62 carry a stripper 64, the function of which will be described hereinafter. The stripper 64 is configured to be received within the central opening 54 of the folding cavity plate 53 with close tolerance. Stripper plate 60 has its side edges engaged in slots 24 and 28 in the stripper plate support frame 19. It will be evident from FIG. 5 that since the stripper 64 is supported from stripper plate 60 by supports posts 62, the stripper will be controlled by cylinders 13 through 16 since stripper plate 60 is operatively connected thereto by the stripper plate support frame 19.

Reference is now made to FIGS. 5 and 11 through 13 wherein the bottom die assembly is illustrated, like parts having been given like index numerals. As in the case of the upper die assembly, the bottom die assembly is diagramatically illustrated in FIG. 5 and more fully illustrated in FIGS. 11 and 13. The bottom die assembly is generally indicated by index numeral 65 as is most clearly shown in FIGS. 5 and 12. The bottom die assembly 65 comprises a bottom die base plate 66. The base plate 66 may be made of steel or other appropriate conductive material. The base plate has a pair of perforations 67 and 68 therein adapted to receive locating pins 69 and 70, respectively, on the bottom die carrier 3 (see FIG. 1), by which the bottom die assembly 65 is affixed to carrier 3. Above base plate 66 there is located the bottom die cavity plate 71 having a central opening or female cavity 72 formed therein. The female cavity 72 has substantially the same peripheral configuration as the folding cavity of the folding cavity plate 53 but is slightly smaller, for reasons stated hereinafter. The upper surface of the cavity plate 71 will be provided with gauge means 73, 74 and 75 permitting proper location of the work piece on the cavity plate prior to the folding and sealing operation, again as will be described hereinafter. Gauge means 73 and 74 will be received within gauge cavity 58 of folding cavity plate 53 and gauge means 75 will be received within gauge cavity 59 thereof.

Cavity plate 71 is provided at its corners with four perforations 76 through 79 in which bushings 80 through 83 are located, respectively, with a press fit. The left hand front corner of bottom die assembly 65 is fragmentarily illustrated in FIG. 13 and shows the perforation 76 and bushing 80 located therein. The bushing 80 is hollow and is adapted to receive a post 84 with a sliding fit. The post 84 is permanently affixed to base plate 66 as by riveting or the like. At its upper end, the post 84 has a large headed screw 85 threadedly engaged therein, the head of screw 85 being larger than the opening in bushing 80 through which post 84 extends. A compression spring 86 surrounds the post 84 and at one end abuts base plate 66 and at the other end abuts the upper end of a recess in bushing 80.

Figures 11, 12:
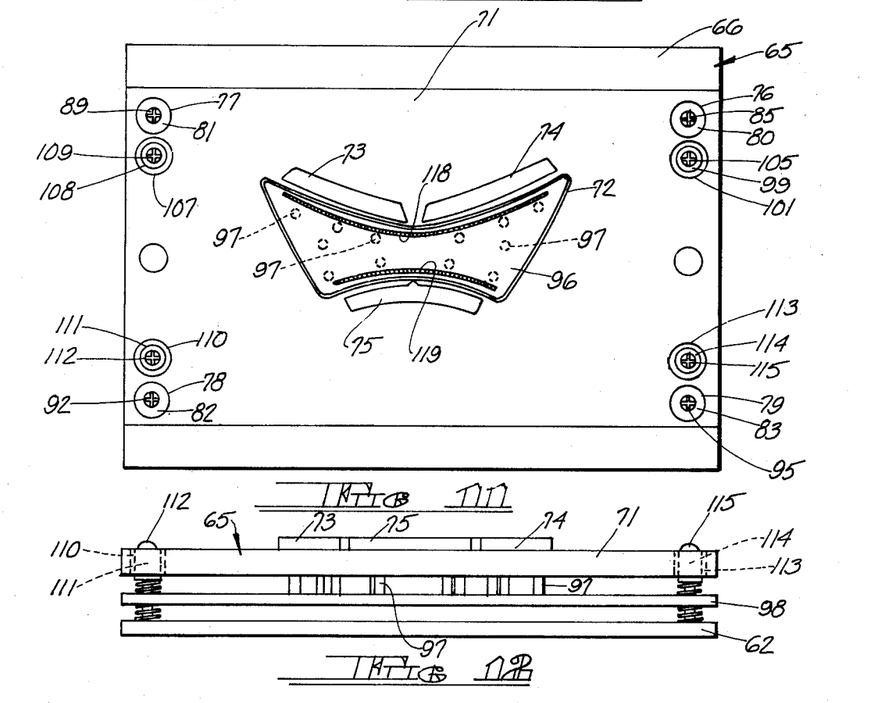
FIG. 11 is a top plan view of the bottom die assembly of the present invention.
FIG. 12 is an elevational view of the bottom die assembly of FIG. 10 as seen from the bottom of that figure
Figure 13:
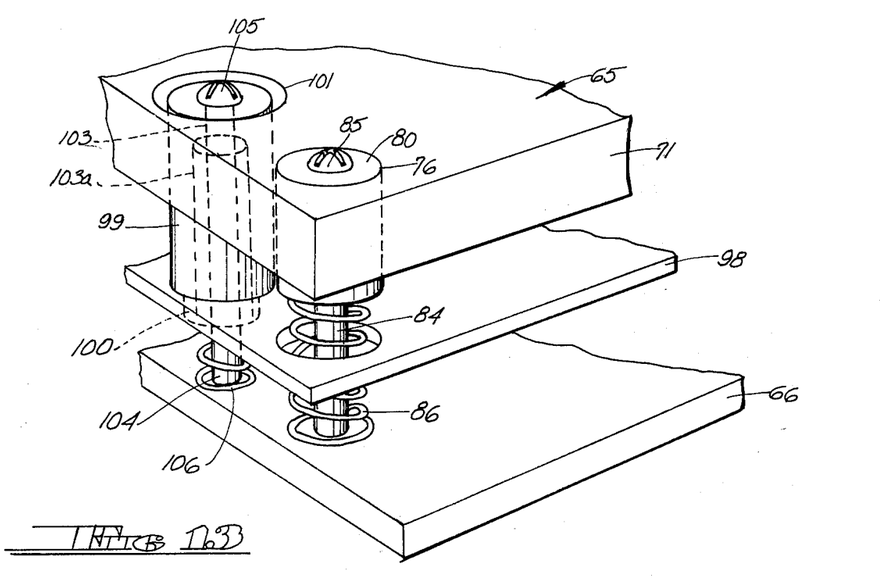
FIG. 13 is a fragmentary perspective view illustrating the left front corner of the bottom die assembly.

From this description, it will be evident that spring 86 urges the cavity plate 71 toward its uppermost position as illustrated in FIGS. 5, 12 and 13, the uppermost position being determined by the head of screw 85 abutting bushing 80. However, since the post 84 is received within bushing 80 with a sliding fit, the cavity plate can be shoved downwardly toward base plate 66 against the action of spring 86.

The mounting of the other three corners of the cavity plate 71 are substantially identical to that illustrated in FIG. 13. Thus, bushing 81 surrounds a post 87 provided with a spring 88 and a screw 89. Bushing 82 surrounds a post 90 with a spring 91 and screw 92 while bushing 83 surrounds post 93 provided with spring 94 and screw 95. Thus, while the cavity plate 71 is normally maintained in its uppermost position by springs 86, 88, 91 and 94, it can be depressed toward base plate 66 against the action of the springs by the upper die assembly 48, as will be evident hereinafter.

Figure 14:
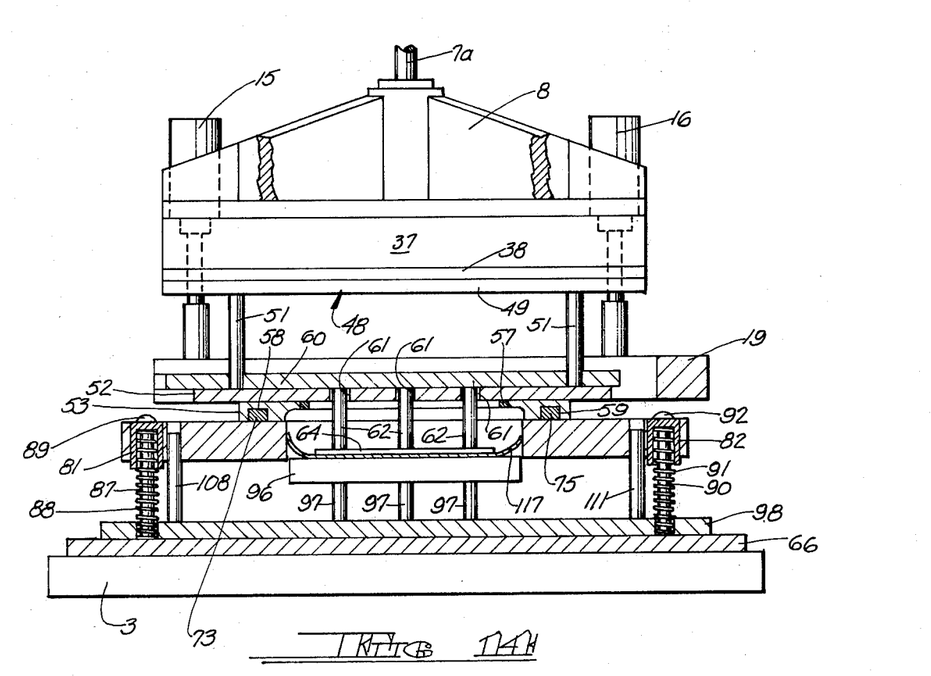
FIG. 14 is a fragmentary, semi-diagramatic, side elevational view, partly in cross section, and illustrating the press and die assemblies in their relative positions having performed the initial 90° fold in the work piece.

Finally, the bottom die assembly 65 includes a male plug 96 so shaped as to be receivable within the female cavity 72 of cavity plate 71 with close tolerance. The male plug 96 is mounted on a plurality of support posts 97, only four of which are shown in FIG. 5 and only 3 of which are shown in FIGS. 14 through 16, for purposes of clarity. The posts 97 are, in turn, mounted on a male plug support plate 98 located between cavity plate 71 and base plate 66.

Reference is again made to FIG. 11 and to FIG. 13 wherein the left hand front corner of the lower die assembly 65 is shown. Near the lower front corner the male plug support plate 98 is provided with a hollow cylindrical bushing 99 having a portion of lesser diameter 100 extending into a perforation in the male plug support plate 98 with a press fit. The remainder of bushing 99 extends upwardly of the male plug support plate 98 and passes through a perforation 101 in the cavity plate 71 with a sliding fit. The interior of bushing 99 is provided with a central bore 103 adapted to receive a post 104 with a sliding fit. The lower end of post 104 is affixed to the base plate 66 as by riveting or the like. The upper end of the post 104 has a screw 105 threadedly engaged therein. The screw 105 has a head larger than the bore 103 so as to determine the uppermost position of the bushing 99 and male plug support plate 98. A portion 103a of bore 103 is of enlarged diameter and is adapted to receive the upper end of a compression spring 106. The upper end of the compression spring abuts the shoulder formed between bore 103 and bore portion 103a. The lower end of compression spring 106 abuts the base plate 66. Thus, the spring 106 serves to urge the male plug support plate 98 to its uppermost position illustrated in FIGS. 5, 12, and 13. The male plug and the male plug support plate may, however, be depressed toward base plate 66, as will be described hereinafter. Since the bushing 99 extends through perforations 101 in the cavity plate 71 with a sliding fit, the cavity plate may be depressed toward the base plate 66 independently of the male plug support plate 98.

It will be understood by one skilled in the art that the remaining three corners of the male plug support plate 98 will be similarly supported from base member 66. Two this end, the cavity plate 71 is illustrated in FIG. 11 as having a perforation 107 adapted to sliding receive a bushing 108 provided with a screw 109; a perforation 110 adapted to receive a bushing 111 provided with a screw 112; and a perforation 113, adapted to accommodate a bushing 114 provided with a screw 115.

To complete the folding and sealing apparatus of the present invention an electrical connection form a high frequency source is made as at 116 (see FIG. 5) to the steel plate 38. Cylinders 13 through 16, casting 8 and main cylinder 7 are insulated from connection 116 by insulative block 37 and the insulators (two of which are shown at 32 and 35) by which cylinders 13 through 16 are operatively connected to the stripper plate support frame 19. Since the top plate 49 of the upper die assembly 48, the support posts 51 and the sub-plate 52 are all conductive, they will serve to connect electrode 57 to the high frequency current. Furthermore, since stripper plate 60, posts 62 and stripper 64 are made of metal and are conductive, the stripper plate will also serve as an electrode energized by the high frequency current since the current will be picked up from sub-plate 52 by sliding contact therewith of support posts 62. Similarly, there is a sliding contact between stripper plate 60 and support posts 51, further assuring that the stripper plate 64 will be energized.

Since the folding cavity plate 53 is made of non-conductive material such as hard plastic or the like, the current will not be shorted by abutting contact between the folding cavity plate 53 and the cavity plate 71 of the bottom die assembly. Thus, the entire bottom die assembly may be made of metal or other conductive material. Under these circumstances, the top die assembly is isolated and the bottom die assembly will serve as a ground. Alternatively, it would be possible to make the entire folding cavity plate 53 of metal or other conductive material. Under these circumstances, the cavity plate 71 of the bottom die assembly should be made of insulative material and the peripheral edge of the male plug must be provided with an insulative insert or coating so as to prevent arcing between the male plug 96 and the folding cavity plate 53 when these elements are in close proximity.

The operation of the folding and sealing apparatus of the present invention may be described as follows. As indicated above, the device is very versatile and numerous operations may be performed thereon. Taking the simpliest instance first, the apparatus may be used to form folded edges in a work piece. For example, a shoe vamp 40 may have its forward edge 41 and rearward edge 42 folded in the manner illustrated in FIG. 2. At the outset the apparatus will be in its normal, at rest condition, as illustrated in FIG. 5, the upper die assembly 48 and the lower die assembly 65 having been mounted in the press as described above. It will be noted that the upper die assembly 48 is in its upward or retracted position since the main cylinder 7 is not energized. The upper die assembly will be maintained in this position by the action of return springs 4 and 5 (see FIG. 1) and the return spring within main cylinder 7 (not shown). Both the cavity plate 71 and the male plug 96 will be in their uppermost positions under the urgings of the springs by which they are supported.

The carrier 3 is pulled forwardly of the apparatus so that the lower die assembly 65 is shifted out from under the upper die assembly 48. The operator is then free to locate a work piece on the cavity plate 71 of the lower die assembly, the gauges 73 through 75 properly positioning the work piece. Thereafter, the carrier 3 and the lower die assembly 65 are returned to their working position beneath the upper die assembly 48. In FIG. 5, a work piece is illustrated at 117.

At this point, the folding and sealing apparatus is ready to be energized. The double acting stripper plate cylinders 13 through 16 are energized so as to maintain the stripper plate 60 in its lowermost position abutting sub-plate 52. This, in turn, will maintain the stripper 64 in its lowermost position as shown in FIG. 5. The main cylinder 7 is also energized to shift the upper die assembly downwardly until the folding cavity plate 53 abuts the cavity plate 71 of the lower die assembly 65. This is illustrated in FIG. 14, wherein like parts have been given like index numerals. FIG. 14 is a side elevational view of the folding and sealing apparatus, with parts in cross section. As the upper die assembly 48 shifts downwardly until the folding cavity plate 53 contacts the cavity plate 71 of the lower die assembly, the gauges 73 and 74 will be received in the gauge cavity 58 of the folding cavity plate 53 while the gauge 75 will be received within the gauge cavity 59. Stripper 64, maintained in its lowermost position by stripper plate cylinders 13 through 16, will force the work piece downwardly into the female cavity 72 of the cavity plate 71 of the bottom die. At the same time, the male plug 96 will be forced downwardly until its support plate 98 abuts the base plate 66. As will be evident from FIG. 14, this initiates a bend in the edge portions of the work piece 117, the periphery of these edge portions lying at an angle of about 90° to the main portion of the work piece.

The complete 180° bend in the edge portions of the work piece is accomplished by continued energization of main cylinder 7. This results in the upper die assembly forcing the cavity plate 71 of the lower die assembly downwardly against its spring suspension until its top surface is substantially coplanar with the top surface of male plug 96 (already in its lowermost position). In order to accomplish this, main cylinder 7 simply over rides the stripper plate support cylinders 13 through 16 so that although still under pressure, the stripper 64 and its support plate 60 are shoved upwardly against the influence of cylinders 13 through 16.

It will be noted from FIGS. 14 through 16 that the folding cavity is slightly larger than the female cavity 72 to insure that the edges of work piece 117 will enter the folding cavity smoothly.

Once the full fold in the edges of work piece 117 has been formed, as illustrated in FIG. 15, the folding and sealing apparatus may be operated in one of three modes. The stripper 64 may be maintained under pressure from stripper plate cylinders 13 through 16. Alternatively, the upper ends of cylinders 13 through 16 may be vented so that stripper 64 remains in the position illustrated in FIG. 15 but only under the influence of the weight of the apparatus and not under pressure from cylinders 13 through 16. In yet a third mode of operation, the double acting stripper plate cylinders 13 through 16 may be oppositely energized so as to pull upwardly on stripper plate 60, causing stripper 64 to abut the underside of sub-plate 53 and pull away from the work piece. This third mode is illustrated in FIG. 16, wherein again like parts have been given like index numerals.

Upon selection of the desired mode of operation (i.e., the stripper plate under pressure from cylinders 13 through 16, the stripper plate not under pressure or the stripper plate retracted against sub-plate 52), the work piece is now in condition to have the folds formed therein sealed. Where the work piece 117 by virtue of its composition, is heat sealable by a high frequency sealing operation, as is true of many well known unsupported, man-made materials, no pretreatment of the work piece is required. Where the work piece is not in and of itself sealable by high frequency sealing means, as is true of leather, non-fusable synthetics, and the like, the work piece should be precoated (at least on those parts to be sealed) with an appropriate one of the well known adhesives which will react under the influence of a high frequency sealing operation.

With the folds completed and the stripper 64 in the desired mode, the electrode 54 is energized after a small delay. The small delay is simply to assure that all of the elements have come to rest. The electrode is energized for a predetermined length of time sufficient to achieve complete and permanent sealing. The determination of the length of time the electrode 57 is energized is well within the skill of the worker in the art and depends upon such factors as the nature of the work piece, the finish of the work piece, the reaction time of the adhesive (if used), or the like. In an instance where the work piece 117 is a single element, the edges of which are simply to be folded and sealed, anyone of the three modes described above may be used. Normally, the third mode (with the stripper retracted) as illustrated in FIG. 16 is preferred since the stripper (which also serves as an electrode) is retracted and the sealing operation is limited to the action of electrode 57, which results in a faster sealing operation.

If it is desired to provide simulated stitching of the type indicated at 45 and 46 in FIG. 3, the male plug 96 will be provided with appropriate embossing indicia 118 and 119 (see FIG. 11). The work piece will be appropriately embossed during the sealing step. Where it is desired that the central portion of the work piece be provided with an embossed design of some sort, appropriate embossing indicia will be provided upon the male plug 96 and under these circumstances it will be desirable to operate the device in accordance with mode 1, i.e., with the stripper under pressure so that proper embossing of the central portion of the work piece can take place.

Figure 17:
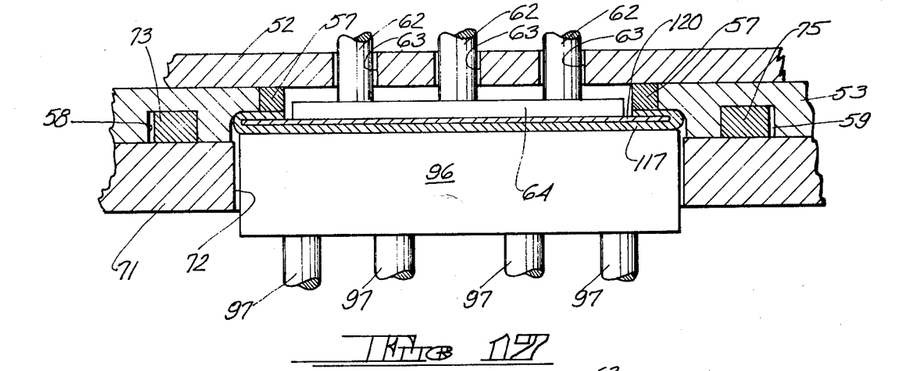
FIG. 17 is a fragmentary, semi-diagramatic, enlarged view (partly in cross section) of the top and bottom die assemblies, illustrating the male plug, stripper and work piece in their respective positions shown in FIG. 15 with a reinforcing member applied to the work piece.

Under some circumstances, it may be desirable to provide the work piece 117 with an additional layer of material of smaller dimensions, so that the folded edges of the work piece will overlap the additional layer. This instance is illustrated in FIG. 17 which corresponds to FIG. 15, like parts having been given like index numerals. In FIG. 17 an additional layer is shown at 120. The additional layer 120 may constitute a reinforcing layer. Alternatively, it may constitute a liner for the work piece. The layer 120 may further be considered to illustrate a two ply layer wherein both a reinforcing element and a liner are applied simultaneously.

In any event, the work piece is properly located on the bottom die and the additional layer 120 is properly located on the work piece. The apparatus is then caused to make an initial bend in the work piece as described with respect to FIG. 14 followed by a final bond in the work piece as described with respect to FIGS. 15 and 16. For purposes of this description, it will be assumed that the work piece 117 and the additional layer 120 are both made of synthetic, heat fusable materials compatable with high frequency heat sealing. If not, the work piece 117 and additional layer 120 should be appropriately precoated with an adhesive, as described above. If it is desired that the layer 120 be heat sealed throughout its length and width to the work piece 117, then it is preferably to operate the folding and heat sealing apparatus under mode 1 with stripper 64 under pressure. This will assure permanent and continuous bonding of the work piece 117 and the additional layer 120. Where it is desired to permanently bond the work piece and the additional layer at the folded edges of the work piece and to lightly bond the remainder of the additional layer to the remainder of the work piece, the folding and sealing apparatus may be operated under mode 2 with the stripper shown in the position illustrated in FIG. 17 but not under pressure from stripper plate cylinders 13 through 16. Under these circumstances complete bonding will occur at the folded edges of the work piece and the adjacent portions of the additional layer, but light bonding between the work piece and the additional layer will result elsewhere. Finally, in an instance where it is desired that the additional layer 120 be sealed to the work piece 117 only at the folded edges thereof, the folding and sealing apparatus should be operated under mode 3 with the stripper 64 in its retracted position (see FIG. 16).

After the sealing operation the high frequency current is shut down and the elements of the folding and sealing apparatus remain stationary for a predetermined time to assure cooling and setting of the sealed parts. The main cylinder is then vented, causing the upper die assembly 48 to return to its uppermost or retracted position shown in FIG. 5. If the folding and sealing apparatus had been activated under mode 3 with the stripper retracted, the stripper plate cylinders 13 through 16 are reversed permitting the stripper 64 to achieve its lowermost position. The carriage 3 and lower die assembly 65 may be shifted to their extended positions, enabling the folded and sealed work piece to be removed from the cavity plate 71 of the lower die assembly and a new work piece positioned thereon. Thereafter, the cycle may be repeated.

In the manufacture of shoes, where the vamp is to be provided with a reinforcing layer, it is the most usual procedure to apply the reinforcing layer directly to the reverse side of the vamp and beneath its folded edges, as described above. Where a liner is to be provided on the vamp, the most usual procedure is to apply the liner after the edges of the vamp have been folded and sealed, the liner hiding the folded edges. Such a structure is illustrated, for example, in FIG. 4. The folding and sealing apparatus of the present invention may also be used to apply a second layer to the vamp after the edges of the vamp have been folded and sealed. This situation is illustrated in FIGS. 18 and 19 wherein, again, like parts have been given like index numerals. In these Figures, a second layer 121 is illustrated as being applied to the work piece 117 after the edges of the work piece have been folded and sealed. While the layer 121 may represent a reinforcing layer or may be considered to represent two plies, one serving as reinforcement and the other as a liner, for purposes of an exemplary showing it will be described as a liner to make a structure of the type shown in FIG. 4.

In order for the liner 121 to be applied to the work piece 117, the edges of the work piece 117 must first be folded and sealed. This is accomplished in the manner heretofore described with respect to FIGS. 5, 14, 15 and 16. As indicated above, the folding and sealing of the edges of work piece 117 may be accomplished through the use of anyone of the three modes (i.e., anyone of the three positions of the stripper 64) of which the folding and sealing apparatus is capable. When the edges have been sealed and an appropriate cooling time alotted, the folding and sealing device is returned to the condition illustrated in FIG. 5 and the carriage 3 and lower die assembly 65 are shifted to their loading and unloading positions. The layer 121 (equivalent to liner 47 of FIG. 4 for purposes of this example) is placed on top of the folded end sealed work piece (equivalent to vamp 40 of FIG. 4). The carriage 3 and the lower die assembly 65 are thereafter returned to their working positions beneath top die assembly 48. At this point, the upper die is lowered by means of main cylinder 7 passing through the stage illustrated in FIG. 14 until the parts achieve their respective positions illustrated in FIG. 15.

Figure 18:
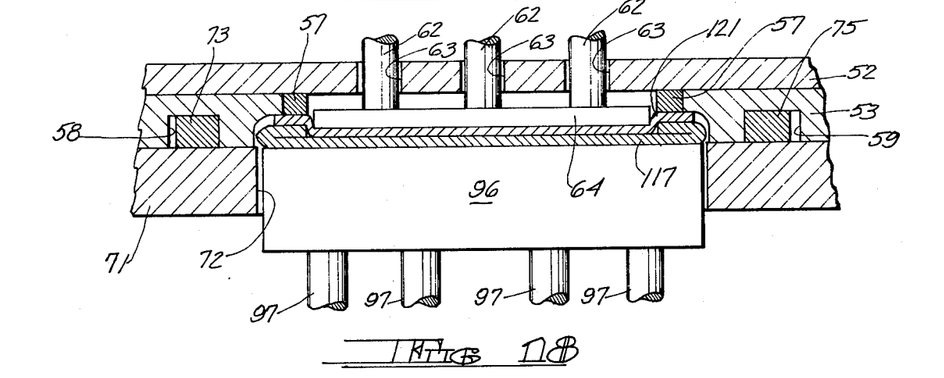
FIG. 18 is an enlarged, semi-diagramatic, fragmentary view (partly in cross section) of the top and bottom die assemblies, similar to FIG. 17 and illustrating the application of a liner to the work piece.

At this stage, any one of the three modes of operation described above may be used. Where it is desired to fully adhere the layer 121 throughout its area to the work piece 117, the first mode will be selected (i.e., with the stripper 64 under pressure). This mode is illustrated in FIG. 18.

After a short pause to assure that all of the parts have become stationary, the high frequency current is energized and the electrode 57 and the stripper 64 both serve as heat-sealing electrodes. Under these conditions, the entire layer 121 will be heat sealed throughout its area to the work piece 117. Again the work piece 117 and layer 121 may be inherently heat sealable, or they may have been previously coated with an appropriate adhesive reactive to a high frequency heat sealing operation. The high frequency current will be shut down after an appropriate length of time and the parts will be allowed to cool sufficiently to assure a firm and permanent bond. Thereafter, the folding and sealing apparatus will be returned to its "open" position illustrated in FIG. 5, in the same manner described above.

Where it is desired to firmly and permanently bond the layer 121 to the folded edges of work piece 117 and only lightly bond the remainder of layer 121 to the remainder of work piece 117, the folding and sealing apparatus of the present invention may be operated in accordance with its second mode, i.e., with the stripper 64 lying against layer 121 but with the stripper plate cylinders 13 through 16 vented so that the stripper is not under pressure. The high energy heat sealing step is then performed and since stripper 64 is not under pressure from cylinders 13 through 16, the central portion of layer 121 will be only lightly bonded to the central portion of work piece 117. Electrode 57, however, will assure that the folded edges of the work piece 171 and the overlying portions of layer 121 will be firmly and fully bonded.

In yet some other instances, it may be desired to bond the layer 121 to the work piece 117 only where the layer overlies the folded and sealed edges of the work piece. Under these circumstances the folding and sealing apparatus of the present invention is operated under the above described mode 3, as illustrated in FIG. 19 wherein like parts have again been given like index numerals.

Two achieve this edge bonding only, so that the central portion of layer 121 and the central portion of work piece 117 are unbonded, the folding and sealing apparatus is brought to its condition illustrated in FIG. 15 and then the stripper 64 is raised away from layer 121 by reversing the stripper plate cylinders 13 through 16. This procedure was described with respect to FIG. 16 and the stripper 64 is clearly shown in its raised position in FIG. 19. After the passage of an appropriate pause to assure that all of the parts have become stationary, the high frequency current is energized. Electrode 57 will assure that the overlying edge portions of layer 121 will be fully and permanently sealed to the folded edges of work piece 117. Stripper 64, in its retracted position, does not act as a sealing electrode and the central portions of layer 121 and work piece 117 are not sealed together.

Figure 19:
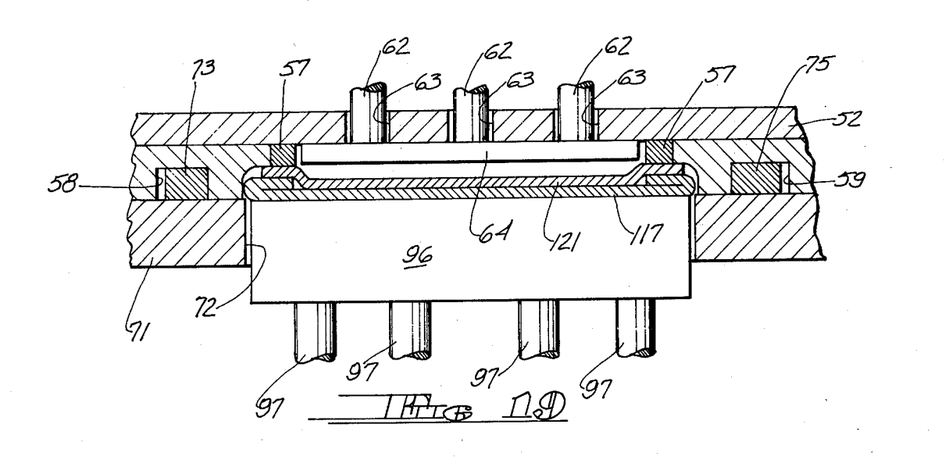
FIG. 19 is an enlarged, semi-diagramatic, fragmentary view (partly in cross section) similar to FIGS. 17 and 18 and illustrating the mode of operation shown in FIG. 16.

In all of FIGS. 17 through 19, the work piece and the additional layer, when present, have been greatly exaggerated in thickness for purposes of clarity. This, in turn, results in an exaggeration of the clearances between stripper 64 and electrode 57 and between male plug 96 and female cavity 72.

From the above description it will be evident that the folding and sealing apparatus of the present invention is capable of functioning in any one of three modes. The selection of the mode can be based on other factors than the nature of the seal to be achieved, as for example on the nature of the material being sealed. These modes, in turn, may be applied to a single work piece or a work piece together with an additional layer of material in the form of reinforcement means, liner means or both. Although the high frequency sealing steps of the present invention makes permanent bonds, the work piece may thereafter be additionally stitched or the like for purposes of appearance. The apparatus and method of the present invention can be additionally utilized to affix a folded and sealed work piece (such as a shoe overlay), with or without a reinforcing layer or a liner layer, to another part of the shoe being made. This simply requires that the parts be appropriately provided with a high frequency energy reactive adhesive, if necessary, or that the parts be inherently sealable together by a high frequency energy sealing step. Finally, the apparatus of the present invention may be used, if desired, to fold the edges of a work piece and to bond them together utilizing a conventional adhesive (such as a rubber-base adhesive, or the like) to form a temporary bond prior to stitching. In such an instance, a conventional folding operating can be performed by the apparatus without connecting the apparatus to a source of high frequency electricity. The nature the control means determining the mode of operation of the apparatus, the actuation of the cylinders, electrodes and the like do not constitute a limitation on the present invention. The mode of operation will be predetermined by initial setting of these controls.

Modifications may be made in the invention without departing from the spirit of it.

The embodiments of the invention in which an exclusive property or privilege is claimed are defined as follows:

1. An apparatus for folding and sealing edges of a non-rigid work piece, said apparatus comprising cooperating lower and upper die assemblies, said lower die assembly comprising a horizontally oriented plate having a female cavity extending therethrough of a shape corresponding to that of the folded work piece, said female cavity plate being shiftable between upper and lower positions and means to resiliently bias said female cavity plate to its upper position, a male plug receivable within said female cavity with close tolerance, said male plug being shiftable between an upper position within said female cavity with its upper surface slightly below the upper surface of said female cavity plate when said female cavity plate is in its upper position and a lower position wherein said male plug is withdrawn from said female cavity when said female cavity plate is in its upper position and wherein the top surface of said plug is substantially coplanar with said top surface of said female cavity plate when said female cavity plate is in its lower position, means to bias said male plug to its upper position, said upper die assembly comprising a horizontally oriented folding cavity plate, said folding cavity plate having a shallow folding cavity therein corresponding in shape to said female cavity, said folding cavity having curved edge portions corresponding to the edges of the work piece to be folded, said folding cavity plate having at least one electrode mounted therein so as to overlie the edges of the work piece when folded, said folding cavity plate having a central depression, a stripper comprising a horizontal plate independently shiftable between an extended position below said folding cavity and a retracted position within said central depression of said folding cavity and means to connect said electrode to a source of high frequency electricity whereby when a work piece is properly aligned on said female cavity plate and said stripper is in its extended position, the folding cavity plate and the stripper may be lowered until said stripper forces said work piece into said female cavity and said male plug to its lower position initiating folding of said work piece edges, continued downward movement of said folding cavity plate shifts said female cavity plate to its lower position resulting in relative upward movement of said male plug and said stripper to cause said partially folded work piece edges to be completely folded by said inwardly curved edge portions of said folding cavity and to lie in abutment with said at least one electrode, to be sealed thereby when connection is made to said source of high frequency electricity.

2. The structure claimed in claim 1 wherein said stripper is made of electrically conductive material and means to connect said stripper to said source of high frequency electricity.

3. The structure claimed in claim 1 including a main fluid actuated cylinder having a piston, said folding cavity plate being operatively connected to said main cylinder piston, at least one auxiliary fluid actuated cylinder having a piston, said at least one auxiliary cylinder being operatively connected to the main cylinder piston, said stripper being operatively connected to said piston of said at least one auxiliary cylinder and shiftable between said extended and retracted positions thereby.

4. The structure claimed in claim 1 wherein said curved edge portions of said folding cavity extend slightly beyond the corresponding edges of said female cavity.

5. The structure claimed in claim 1 wherein said upper die assembly comprises a horizontally oriented top plate, a plurality of downwardly depending support posts affixed to said top plate, a sub-plate supported by said posts in parallel spaced relationship to said top plate, said folding cavity plate being affixed to said sub-plate, a stripper support plate being located between said top plate and said sub-plate with perforations in said stripper plate to permit passage of said top plate support posts therethrough with a sliding fit, a plurality of downwardly depending support posts on said stripper support plate, said stripper being mounted on said stripper support plate posts, a portion of said sub-plate defining a surface of said central depression of said folding cavity, said portion of said sub-plate having a plurality of perforations therein to permit passage therethrough of said stripper support plate posts with a sliding fit.

6. The structure claimed in claim 1 wherein said bottom die assembly comprises a base plate, said female cavity plate being located above said base plate and in parallel spaced relationship thereto, said female cavity plate being slidably mounted on a first set of upstanding posts affixed to said base plate, compression spring means surrounding each of said first set of posts to urge said female cavity plate to its upper position and means on each of said first set of posts to determine said upper position of said female cavity plate, a male plug support plate being located between said base plate and said female cavity plate, said male plug support plate having a plurality of supports extending upwardly thereof to which said male plug is affixed, said male plug support plate being slidably mounted on a second set of upstanding posts affixed to said base plate, compression spring means surrounding each of said second set of posts to urge said male plug support plate and said male plug to said upper position of said male plug and means on each of said second set of posts determining said last mentioned upper position, said lower position of said male plug being determined by abutment of said male plug support plate and said base plate.

7. The structure claimed in claim 5 including a main fluid-actuated cylinder having a piston, said top plate being operatively connected to said main cylinder piston, at least one auxiliary fluid-actuated cylinder having a piston, said at least one fluid actuated cylinder being operatively connected to said main cylinder piston, said stripper support plate being operatively connected to said piston of said at least one auxiliary cylinder, said top die assembly being electrically insulated from said pistons of said main and at least one auxiliary cylinder.

8. The structure claimed in claim 5 wherein said top plate, said top plate support posts, and subplate, said stripper support plate, said stripper support plate posts and said stripper are made of electrically conductive material, said folding cavity plate being made of electrically insulative material.

9. The structure claimed in claim 5 wherein said entire top die assembly is made of electrically conductive material.

10. The structure claimed in claim 5 wherein said bottom die assembly comprises a base plate, said female cavity plate being located above said base plate and in parallel spaced relationship thereto, said female cavity plate being slidably mounted on a first set of upstanding posts affixed to said base plate, compression spring means surrounding each of said first set of posts to urge said female cavity plate to its upper position and means on each of said first set of posts to determine said upper position of said female cavity plate, a male plug support plate being located between said base plate and said female cavity plate, said male plug support plate having a plurality of supports extending upwardly thereof to which said male plug is affixed, said male plug support plate being slidably mounted on a second set of upstanding posts affixed to said base plate, compression spring means surrounding each of said second set of posts to urge said male plug support plate and said male plug to said upper position of said male plug and means on each of said second set of posts determining said last mentioned upper position, said lower position of said male plug being determined by abutment of said male plug support plate and said base plate.

11. The structure claimed in claim 6 wherein said entire bottom die assembly is made of electrically conductive material.

12. The structure claimed in claim 6 wherein said female cavity plate and the peripheral edge of said male plug are made of electrically insulative material, the remainder of said bottom die assembly being made of electrically conductive material.

13. The structure claimed in claim 10 wherein said folding cavity plate is made of electrically insulative material, the remainder of said top die assembly and said entire bottom die assembly being made of electrically conductive material.

14. The structure claimed in claim 10 wherein said female cavity plate and the peripheral edge of said male plug are made of electrically insulative material, the remainder of said bottom die assembly and said entire top die assembly being made of electrically conductive material.

15. A process of folding and sealing edges of a non-rigid, heat sealable work piece comprising the steps of providing a lower die assembly comprising a horizontally oriented plate with a female cavity extending therethrough of a shape corresponding to that of the folded work piece, said female cavity plate being shiftable between upper and lower positions and resiliently biased to said upper position and a male plug receivable within said female cavity with close tolerance, said male plug being shiftable between an upper position with the female cavity with its upper surface slightly below the upper surface of said female cavity plate when said female cavity plate is in its upper position and a lower position wherein said male plug is withdrawn from said female cavity when said female cavity plate is in its upper position and wherein the top surface of said plug is substantially coplanar with said top surface of said female cavity plate when said female cavity plate is in its lower position, means to bias said male plug to its upper position, providing an upper die assembly comprising a horizontally oriented folding cavity plate, said folding cavity plate having a shallow folding cavity therein corresponding in shape to said female cavity, said folding cavity having curved edge portions corresponding to the edges of the work piece to be folded, said folding cavity plate having at least one electrode mounted therein so as to overlie the edges of the work piece when folded, said folding cavity plate having a central depression, a stripper comprising a horizontal plate independently shiftable between an extended position below said folding cavity, and a retracted position within said central depression of said folding cavity, locating said work piece on said female cavity plate over said female cavity, maintaining said stripper in its extended position, lowering said upper die assembly until said stripper forces said work piece into said female cavity depressing said male plug to its lower position and initiating a fold in said edges of said work piece, maintaining the positions of said stripper, said work piece and said male plug, continuing lower of said folding cavity plate resulting in abutment of and lowering of said female cavity plate to its lower position wherein said male plug has reentered said female cavity shoving said work piece into said folding cavity to complete folding of said work piece edges and to cause them to abut said electrode, connecting said electrode to a source of high frequency electrical current to seal said folded edges, permitting said sealed edges to cool until a seal is assured and raising said upper die assembly to shift said folding cavity plate and said stripper out of contact with said lower die assembly and said work piece.

16. The process claimed in claim 15 including the step maintaining said stripper in contact with said work piece and under pressure thereagainst during said sealing and cooling steps.

17. The process claimed in claim 15 including the step of maintaining said stripper in contact with said work piece without pressure thereagainst during said sealing and cooling steps.

18. The process claimed in claim 15 including the step of maintaining said stripper in said retracted position within said folding cavity depression and out of contact with said work piece during said sealing and cooling steps.

19. The process claimed in claim 15 including the steps of locating a second layer of heat sealable material over the work piece prior to said folding step, folding said work piece edges over the adjacent edges of said second layer, and sealing said folded edges of said work piece to said adjacent edges of said second layer.

20. The process claimed in claim 15 including the steps of locating a second layer of heat sealable material over the work piece after said folding, sealing and cooling steps, the edges of said second layer overlying said folded and sealed edges of said work piece, maintaining said stripper in its extended position, lowering said upper die assembly until said stripper forces said work piece and said second layer into said female cavity depressing said male plug to its lower position, maintaining the positions of said stripper, said work piece, said second layer and said male plug, continuing lowering of said folding cavity plate resulting in abutment of and lowering of said female cavity plate to its lower position wherein said male plug has reentered said female cavity shoving said work piece and second layer into said folding cavity with said overlying edges of said second layer in abutment with said electrode, connecting said electrode to a source of high frequency electrical current to seal said overlying edges of said second layer to said folded and sealed edges of said work piece, permitting said sealed overlying edges to cool until a seal is assured and raising said upper die assembly to shift said folding cavity plate and said stripper out of contact with said lower die assembly and said work piece and second layer.

21. The process claimed in claim 19 wherein said second layer comprises a reinforcing layer.

22. The process claimed in claim 19 wherein said second layer comprises a liner for said work piece.

23. The process claimed in claim 19 wherein said stripper is electrically conductive and including the steps of maintaining said stripper in contact with said second layer and under pressure thereagainst during said sealing and cooling steps and connecting said stripper to said source of high frequency electrical current during said sealing step to seal said second layer overall to said work piece.

24. The process claimed in claim 19 wherein said stripper is electrically conductive and including the steps of maintaining said stripper in contact with said second layer without pressure during said sealing and cooling steps and connecting said stripper to said source of high frequency electrical current during said sealing step whereby said edges of said second layer will be fully bonded to said edges of said work piece and the remainder of said second layer will be lightly bonded to the remainder of said work piece.

25. The process claimed in claim 19 wherein said stripper is electrically conductive and connected to said source of high frequency energy during said sealing step and including the step of maintaining said stripper in said retracted position within said folding cavity depression and out of contact with said second layer during said sealing and cooling steps whereby only said edges of said second layer will be bonded to said work piece.

26. The process claimed in claim 20 wherein said second layer comprises a reinforcing layer.

27. The process claimed in claim 20 wherein said second layer comprises a liner for said work piece.

28. The process claimed in claim 20 wherein said stripper is electrically conductive and including the steps of maintaining said stripper in contact with said second layer and under pressure thereagainst during said sealing and cooling steps and connecting said stripper to said source of high frequency electrical current during said sealing step to seal said second layer overall to said work piece.

29. The process claimed in claim 20 wherein said stripper is electrically conductive and including the steps of maintaining said stripper in contact with said second layer without pressure during said sealing and cooling steps and connecting said stripper to said source of high frequency electrical current during said sealing step whereby said edges of said second layer will be fully bonded to said edges of said work piece and the remainder of said second layer will be lightly bonded to the remainder of said work piece.

30. The process claimed in claim 20 wherein said stripper is electrically conductive and connected to said source of high frequency energy during said sealing step and including the step of maintaining said stripper in said retracted position within said folding cavity depression and out of contact with said second layer during said sealing and cooling steps whereby only said edges of said second layer will be bonded to said work piece.

* * * * *